United States Patent [19]

Hareng et al.

[11] 4,040,047
[45] Aug. 2, 1977

[54] ERASABLE THERMO-OPTIC STORAGE DISPLAY OF A TRANSMITTED IMAGE

[75] Inventors: Michel Hareng; Serge Le Berre; Erich Spitz, all of Paris, France

[73] Assignee: Thomson-CSF, Paris, France

[21] Appl. No.: 585,715

[22] Filed: June 10, 1975

[30] Foreign Application Priority Data

June 14, 1974 France .................................. 74.20715

[51] Int. Cl.² .............................................. G06F 3/14
[52] U.S. Cl. ........................ 340/324 R; 340/173 LT; 350/160 LC
[58] Field of Search ................ 178/7.6; 340/324 R, 340/324 M, 173 PP, 173 LT, 173 CH; 350/160 LC

[56] References Cited

U.S. PATENT DOCUMENTS

| | | | |
|---|---|---|---|
| 3,438,022 | 4/1969 | Teeg et al. | 340/324 R |
| 3,524,726 | 8/1970 | DeKoster | 340/324 R |
| 3,637,291 | 1/1972 | Kessler et al. | 350/160 LC |
| 3,691,482 | 9/1972 | Pinnow et al. | 340/324 R |
| 3,916,420 | 10/1975 | Brown et al. | 350/160 LC |
| 3,917,481 | 11/1975 | Saeva et al. | 350/160 LC |
| T940,016 | 11/1975 | Nelson | 350/160 LC |

*Primary Examiner*—Marshall M. Curtis
*Attorney, Agent, or Firm*—Cushman, Darby & Cushman

[57] ABSTRACT

The invention provides an optical display device, utilizing a thermo-optical effect to inscribe a transmitted image in a film of a material exhibiting a smectic state. The crystal liquid layer is inserted between transparent electrodes and heated to be in the smectic mesophase. The image is recorded in the layer under the form of variations in the scattering coefficient thereof by applying the video signal transmitting the image between the electrodes, while an infra-red beam of constant intensity synchronously scans the layer at a constant rate to successively raise each point beyond the melting point of the liquid crystal material. A quick erasure of the recorded image is provided by applying between the electrodes a voltage pulse of suitable value.

14 Claims, 3 Drawing Figures

ERASABLE THERMO-OPTIC STORAGE DISPLAY OF A TRANSMITTED IMAGE

This invention relates to optical storage and display devices and more particularly to liquid crystal devices capable of storing and displaying white transmitted images. The invention describes an electro-optical device utilizing the thermo-optical effects which occurs in liquid crystals exhibiting a smectic phase. This simple and inexpensive device provides a black and white image with the whole required range of half-tones and extremely quick erasure.

BACKGROUND OF THE INVENTION

In prior art, it is known that, when a thin film of a material exhibiting a smectic phase is cooled from the liquid phase, the optical apparance of the thin film closely depends upon the rate of cooling; if cooling is slow, the material will orientate itself uniformly and the film will appear perfectly transparent; if, however, the transition from the liquid phase to the smectic phase takes place very rapidly, then in the film domains occur which have different orientations in relation to one another and give rise to strong scattering of the transmitted or reflected light. It is well-known to utilise this effect in order to temporarily record an image on a liquid crystal film presenting a smectic phase. The material, arranged between two glass plates, is maintained at a temperature such that it is in its smectic phase but as close as possible to the transition temperature to the nematic phase; the molecules are uniformly orientated and the film is transparent. A light beam (the terms "light" and "luminous", here as in the remainder of the text, are used in the broadest possible sense to designate electromagnetic radiations in the ultra violet, visible and infra-red parts of the spectrum), generally chosen within the near-infra-red part of the spectrum and intensity modulated, scans the surface of the film. When the energy locally introduced by the beam has been sufficient to produce melting at a point in the film, then, on the occasion of the rapid cooling which follows, a texture forms which diffuses the light whilst the unmelted points remain transparent.

The two problems posed by this method are those of erasing and the production of half-tones.

Erasing can be effected in two ways. The first is to heat the whole film until the liquid phase appears and then to cool it in a controlled manner in order to bring about the formation of an ordered, transparent structure. A second, which enables selective erasing to be carried out, consists in subjecting the film to an alternating transverse electric field having a frequency of the order of 1 kHz, whilst carrying out scanning with the modulated light beam as at the time of recording. The points raised to the melting temperature by the beam, under the orientating influence of the field, return to an ordered smectic phase and therefore become transparent. These two methods of erasing have the drawback that they are slow.

In order to obtain half-tones, it has been suggested to utilize as a thin film, a mixture of two constituents. Then, the fusion of the film does not occur at a well defined temperature, but ranges along a certain temperature gap, for which the material is pasty. The higher is the intensity of the recording beam and consequently the closer the material approaches the highest temperature of this gap, the more pronounced the disorder in the texture obtained after cooling and the correspondant light scattering. Unfortunately, it is difficult in this way to obtain a satisfactory range of half-tones. Moreover, the modulator is an expensive element and its inclusion results in a loss in the power available for recording and therefore in a reduction in the image recording rate.

SUMMARY OF THE INVENTION

The invention seeks to overcome these various drawbacks of the prior art by subjecting the thin film both at the time of recording and at the time of erasing, to the effect of an electric field of appropriate strengths. It is possible then, in the absence of any scanning beam, to achieve overall erasing of the cell in a very short time. In addition, recording, both of black and white and of the half-tones, is carried out by scanning the film with a beam of constant intensity; the beam modulator is discarded and the video signal is applied directly between two electrodes between which the film is located.

BRIEF DESCRIPTION OF THE DRAWING

The invention together with its features, advantages and objects, can be better understood from the following detailed description, when read in conjunction of the drawing in which.

DETAILED DESCRIPTION OF THE INVENTION

Figure 1:
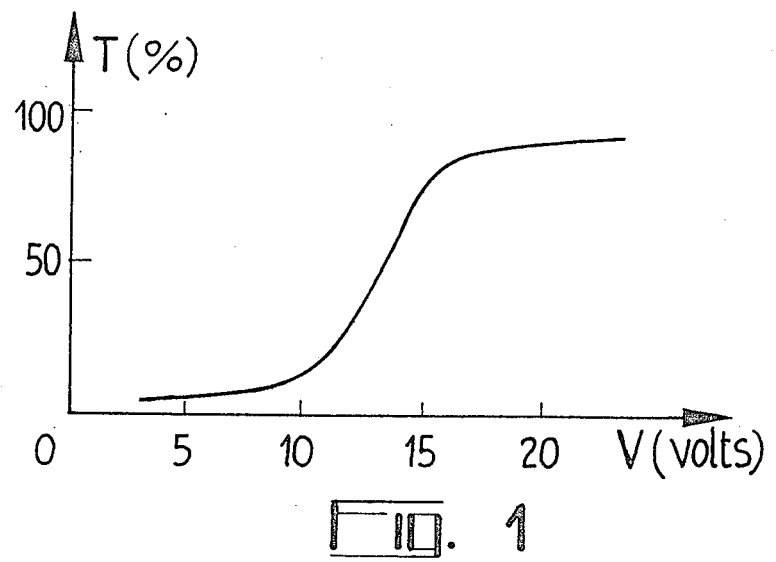
FIG. 1 is a graph illustrating the operation of the device in accordance with the invention.

Studies have been carried out in the laboratories of the applicant, on various classes of liquid crystals exhibiting a smectic phase, and in particular on substances in the diphenyl-nitrile family. Compounds belonging to this family, for example octyl-nitrile-4-4'-diphenyl, of the formula:

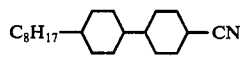

or octyl-oxy-nitrile-4-4'-diphenyl, of the formula:

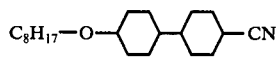

or mixtures of these substances, exhibit a smectic phase A at ambient temperature, in which the long molecules constituting these compounds tend to organise themselves into a homeotropic structure (the long molecules arrange themselves in a uniform orientation perpendicularly to the supporting plates). This homeotropic orientation in which the thin film is perfectly transparent, is facilitated if the supporting plates are coated with certain materials, for example silane.

In these compounds, the following transitions are observed:

at $T_1$ : a transition from the solid crystalline phase to the smectic phase A;

at $T_2$ : a transition from the smectic phase A to the nematic phase;

at $T_3$: a transition from the nematic phase to the isotropic liquid phase.

By way of example, the transition temperatures for octyl-nitrile-4-4'-diphenyl are as follows:

$$T_1 = 20° C; T_2 = 32° C; T_3 = 39.5° C.$$

The studies carried out have pointed up two important results.

The first of these results is concerned with the re-structuring of the material in the smectic phase, from the disordered, light scattering structure, also known as the "focal conic structure", to the homeotropic structure which is an ordered and transparent one. It has been observed that by subjecting the thin film to the effect of a direct or alternating electric field (in the latter case at a frequency which may reach up to 50 kH$_3$), perpendicular to the plane of the film, a very rapid transition from the focal conic structure to the homeotropic structure can be obtained without any need to go through the liquid phase. Taking films 8 microns in thickness, conversion from the scattering state to the transparent state can be achieved in 100 milliseconds by applying across the film a 50 volts voltage. This provides an extremely simple tool to use in order to effect erasing of images recorded by thermo-optical effect.

The second of these results is concerned with the effect due to the application of an electric field at the time of transition from the liquid phase to the nematic phase. It has been discovered that during fast cooling of the material in the liquid phase, the application of a direct or alternating electric field (in the latter case at a frequency ranging between 0 and 50 kH$_3$) perpendicular to the plane of the thin film, contributed to the homeotropic orientation of the material, and thus provided means for controlling the state of disorder of the focal conic structure; it is thus possible depending upon the strength of the applied field, to achieve a continuous transition between the fully scattering state (corresponding to the state of maximum disorder) which occurs at zero field, and the fully transparent state (corresponding to the fully homeotropic structure) which occurs at maximum field.

The graph of FIG. 1, which relates to an 8 micron thick film of octyl-nitrile-4-4'-diphenyl, summarises these observed phenomena; as a function of the voltage V (in volts) applied to the film and plotted on the abscissae, this graph shows the true transmission factor T (the percentage, in relation to the incident light, of the light directly transmitted, excluding scattered light) of a point in the material after transition to the liquid phase under the action of the light beam scanning the film, and return to the smectic phase. For voltages of less than 10 volts, the material produces major scatter and the point appears black by transmission (transmission factor of less than 10%). Between 10 and 15 volts, the homeotropic structure becomes more and more pronounced and the material scatters less and less, the transmission factor then varying from 10 to 90%; this is the half-tone region in which the point appears progressively brighter and brighter; finally, at 20 volts, the full homeotropic structure is gained and the point exhibits a transparency of 100%. It has also been observed that the voltage applied is only operative during the very brief time of cooling and therefore does not modify the more or less scattering condition of neighbouring points.

The observation summarized in the graph of FIG. 1, show that recording of an image with half-tones can be achieved by thermo-optical effect, without any modulation of the light beam scanning the cell by the video signal, by simply using this video-signal to modulate a voltage applied to the cell.

Figure 2:
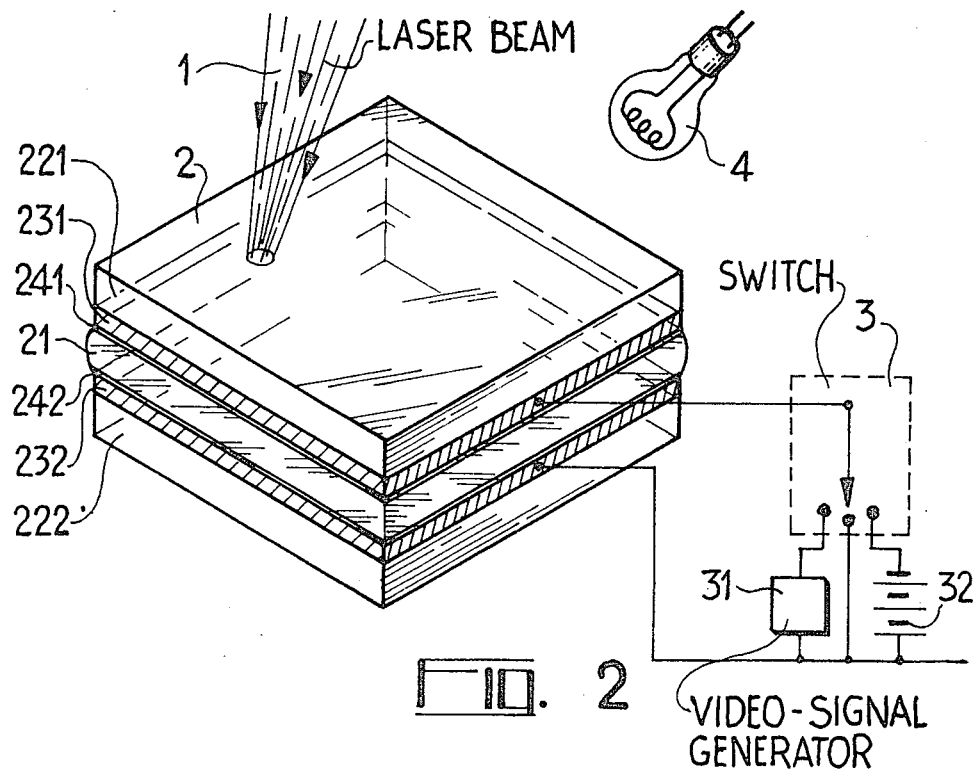
FIG. 2 illustrates an image reproduction device in accordance with the invention.

FIG. 2 illustrates a device for reproducing black and white images, which utilizes the experimental result set out hereinbefore. A convergent recording beam 1 having a wavelength of 1.06 microns and coming from a YAG laser source not shown in the figure, scans the cell 2. The latter is constituted by a thin film 21 of octyl-nitrile-4-4'-diphenyl arranged between two parallel glass pltes 221 and 222; on these two plates, two transparent electrodes 231 and 232 are arranged, these being constituted for example by a deposit of mixed indium and tin oxide; these electrodes are preferably coated, although this is not absolutely essential, on those of their phases in contact with the thin film 21, with a fine film of silane, respectively 241 and 242. A three-way switch 3 applied between the two electrodes 231 and 232 either the video signal corresponding to a director alternating voltage varying between 0 and 20 volts and coming from the video signal generator 31, or the constant direct or alternating voltage having a peak value of only 50 volts, coming from the voltage generator 32, or shortcircuits the two electrodes. A light source 4 enables the cell 2 to be illuminated. This source may simply be constituted by the ambient light.

The cell 2 is thermostatically controlled by means which have not been shown in the figure, to a temperature T ranging between $T_1 = 20°$ C and $T_2 = 32°$ C, so that the material of which the film 21 is made is in the smectic phase when not subjected to the action of the beam 1; the temperature T is chosen to be as close to $T_2$, the temperature of the smetic-nematic transition, as the accuracy of the thermostat will permit. It is also possible to employ the two electrodes as heating resistors in order to maintain the film 21 at a required temperature.

To record the image, the beam 1 scans at uniform rate the cell 2, being focussed on the film 21 which is assumed initially to be in a condition of uniform homeotropic orientation. Throughout the time of scanning, the switch 3 connects the electrodes 231 and 232 to the video signal generator 31; the whole of the thin film 21 is then subjected to the variable voltage representing the video signal. The energy transmitted by the beam is absorbed in the two films 231 and 232 constituting the electrodes and transmitted to the film 21. The beam intensity is constant; it is designed, as a function of the dimension of the focal spot and of the scanning speed, to ensure that the energy locally introduced by the beam is sufficient to raise a point on the material of which the film 21 is made, to a temperature T slightly higher than $T_3$, thus producing melting of the point in the material.

As soon as the beam has moved on, the point which has melted tends to revert instantaneously to the temperature T determined by the thermostat and thus to convert from the liquid phase to the smectic phase, passing through the intermediate nematic phase. This double transition takes place at a field strength determined by the value of the voltage corresponding to the video signal applied to the overall film at this precise instant; the instantaneous value of this field strength fixes the degree of order of the smectic structure and therefore the maximum or minimum degree of scattering on the point in question. Thus, if the cell 2, illuminated by the source 4, is observed by transmission, then the points recorded at low field strength and therefore exhibiting maximum scatter, will appear black whilst those recorded at maximum field strength, thus perfectly ordered and transparent, will appear white. If observed by reflection, then the cell 2 will produce a reverse image: black and white points will correspond respectively to maxima and minima in the video signal. Depending upon the situation, the video signal may be constituted by a voltage of constant sign, continuously variable between 0 and 20 volts, or by an alternating carrier voltage amplitude-modulated by the video signal.

When the scanning of the cell has been completed and the whole image recorded, the recording beam 1 is cut off and the electrodes 231 and 232 are short-circuited by the switch 3. The recorded image can be stored for several hours. To erase the image, the beam 1 remains cut off and the switch 3 connects the electrodes 231 and 232 to the constant voltage of around 50 volts. Under the influence of the latter, the film 21 becomes uniformly orientated with a homeotropic structure, this orientation being promoted by the silane coatings 241 and 242; the cell becomes transparent over its whole area and is then ready for a fresh recording. In this way, the erasing of the image can be achieved in around 100 microseconds. Although, earlier on, compounds (octyl-nitrile-diphenyl, octyl-oxy-nitrile-diphenyl and mixtures thereof) have been described which are well suited to the production of the thin film 21, there is no doubt that other compounds and mixtures could be found, in particular within the diphenyl-nitrile family, which would exhibit a smectic phase and would be suitable for the same kind of application; it is within the spirit and scope of the invention to utilise these substances in the manner herein-before described.

In FIG. 2, for reasons of simplicity, the contact breaker 3 has been illustrated as a manually operated contact breaker. However, it could better be replaced by an electronic switching arrangement if the phases of recording and erasing are to succeed one another at a higher rate.

The wavelength of the recording light beam described in the above example as being located in the near-infra-red, may in fact be chosen to fall within any part of the range extending from the ultra-violet to the infra-red; the primary criteria governing this choice are the avilable power of the source and the cell absorption; in this latter context, the radiation should be chosen in such a fashion that it is absorbed either by the material of which the film 27 is made or by one or two supplementary films in contact with the film 21. In view of the fact that around 1 nanojoule per cubic micron of material is required in order to bring about the smectic-liquid transformation, a beam having a power of 1 watt and furnishing a focal spot in the order of 50 microns in diameter, makes it possible to record an image of 200 × 200 points in 1 second.

Figure 3:
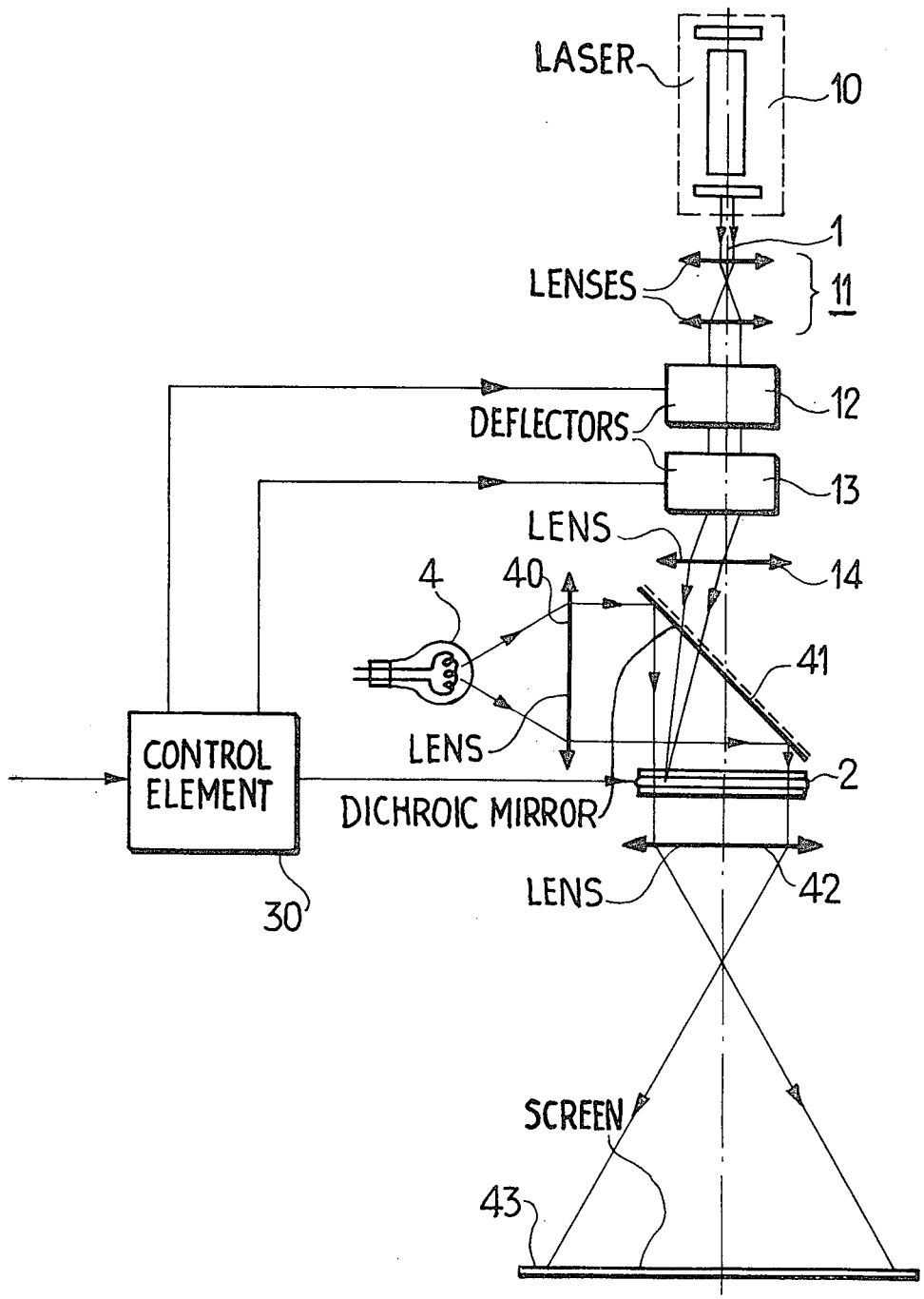
FIG. 3 illustrates a telereproduction device utilizing the device in accordance with the invention.

By way of an example, FIG. 3 describes a teletransmission and telereproduction system for black and white images, which utilizes the image reproduction device described hereinbefore. A YAG laser source 10 emits the recording beam in the form of a parallel light beam 1 which passes through an optical system 11 designed to increase its diameter, and then through the two electro-optical or electro-acousto-optical deflectors 12 and 13, which enable the beam direction to be varied in a plane which is that of the figure and in a plane at right angles thereto; it is then focussed by the objective lens 14, through the dichroic mirror 41, in the plane of a cell 2 identical to that described in FIG. 2, and more precisely in the central plane of the material constituting the film 21 of FIG. 2.

A light source 4, at the focus of a collimating lens 40, emits a parallel illuminating beam which, reflected by the dichroic mirror 41, uniformly illuminates the entire surface of the cell 2; the cell 2 thus illuminated by transmission, modulates said parallel beam as a function of the varying states of scattering which its different points produce; the objective lens 42 projects upon the plate 43 the image recorded upon the film marked 21 in FIG. 2 and forming part of the cell 2.

The control element 30 receives the video signal and its synchro pulses. On the one hand, it distributes the synchro pulses between the respective inputs of the defectors 12 and 13, and on the other replaces the manual switch 3 of FIG. 2; on receiving the synchro pulse which triggers the scanning of the image, it applies the video signal between the electrodes and short-circuits these latter on occurrence of the synchro pulse corresponding to the end of the image; a special synchro pulse triggers the erase voltage which is also supplied by the control element 30.

If the illuminating light is chosen within a wavelength range such that it is not absorbed by the cell 2, it is possible to utilize a very powerful source 4 without disturbing the operation of the cell 2 by heating, and thus to project the image reproduced by the cell onto a large-sized screen arranged in the plane 43.

In this fashion, a large-screen teletransmission system for black and white images, can be created.

By arranging a photosensitive material in the plane 43, instead of a screen, the system described can be utilized for black and white facsimile transmission (telereproduction system).

What we claim is:
1. A method of successively inscribing, storing and erasing in a film at least one image transmitted under the form of a video-signal voltage, said method comprising:
   an inscription step during which each point of said film corresponding to a point of said image is successively submitted to a temporary heating from a first to a second temperature and consecutively cooled from said second to said first temperature; said first and second temperature being substantially identical in every said point; said video-signal voltage being simultaneously applied to the whole of said points for spatially modulating an optical characteristic of said film;
   a storing step, during which said film being maintained at said first temperature, a null voltage is applied to the whole of said points;
   an erasure step, during which said film being maintained at said first temperature, a constant erasure voltage is simultaneously applied to the whole of said points.

2. A method as recited in claim 1, wherein said film exhibits a smectic state and an isotropic liquid state respectively at said first and said second temperatures; said optical characteristic being the light scattering coefficient.

3. A method as recited in claim 1, wherein said video-signal and erasure voltages are direct voltages.

4. A method as recited in claim 1, wherein said video-signal and erasure voltages are alternating voltages.

5. A method as recited in claim 1, wherein said erasure voltage has a value greater than twice the peak value of said video-signal voltage.

6. A method as recited in claim 1, wherein a luminous beam of constant intensity scans said film at a uniform velocity for providing said temporary heating of each said points.

7. A device for successively inscribing, storing and erasing at least one image transmitted under the form of a video-signal voltage, including:
- a liquid crystal cell comprising a film of a material exhibiting at least one liquid crystal state; said film being enclosed between two transparent electrodes and maintained at a first constant temperature; said film being in said liquid crystal state at said first constant temperature;
- switching means for successively applying between said electrodes said video-signal voltage, a null voltage and an erasure voltage pulse;
- optical scanning means for providing a beam of substantially constant intensity with substantially uniform scanning rate, said beam scanning said film for temporarily heating successively each point thereof from said first constant temperature to a second temperature; said film exhibiting an isotropic liquid state at said second temperature.

8. A device as recited in claim 7 wherein said liquid crystal state is a smectic state.

9. A device as recited in claim 8, wherein said material comprise at least one compound from the diphenyl-nitrile family.

10. A device as recited in claim 9, wherein said compound is octyl-nitrile-4-4'-diphenyl.

11. A device as recited in claim 9, wherein said compound is octyl-oxy-nitrile-4-4'-diphenyl.

12. A device as recited in claim 7, wherein said video-signal voltage further comprising synchronization pulses, said optical scanning means comprise optical focusing means for focusing said beam onto said film and optical deflector means electrically controlled by said synchronization pulses for deflecting said beam; said synchronization pulses further controlling said switching means.

13. A device as recited in claim 7, further comprising an illumination source, optical illuminating means for illuminating the whole said cell by said source, optical projecting means for projecting the image of said film, and a screen for receiving said image.

14. A device as recited in claim 13, wherein said screen is photosensitive.

* * * * *